US006809432B1

(12) United States Patent
Bilgen

(10) Patent No.: US 6,809,432 B1
(45) Date of Patent: Oct. 26, 2004

(54) WIND POWER GENERATING SYSTEM

(76) Inventor: Albert W. Bilgen, 1029 S. Oak Knoll Rd., Lake Forest, IL (US) 60045

( * ) Notice: Subject to any disclaimer, the term of this patent is extended or adjusted under 35 U.S.C. 154(b) by 0 days.

(21) Appl. No.: 10/741,544

(22) Filed: Dec. 19, 2003

(51) Int. Cl.[7] .............................. F03D 3/02; F03D 7/00; F03B 15/06; H02P 9/04
(52) U.S. Cl. .............................. 290/55; 290/44; 415/2.1
(58) Field of Search ........................... 290/1 R, 55, 44; 416/DIG. 6; 415/2.1, 4.2

(56) References Cited

U.S. PATENT DOCUMENTS

| | | | | |
|---|---|---|---|---|
| 3,885,163 A | * | 5/1975 | Toberman | .................... 290/1 R |
| 4,329,593 A | | 5/1982 | Willmouth | |
| 4,382,190 A | * | 5/1983 | Jacobson | ..................... 290/55 |
| 4,419,587 A | * | 12/1983 | Benton | ......................... 290/44 |
| 5,122,031 A | * | 6/1992 | Westwood | .................. 412/2.1 |
| 5,137,416 A | * | 8/1992 | Mohrman | ................... 415/2.1 |
| 5,272,378 A | | 12/1993 | Wither | |
| 5,348,443 A | * | 9/1994 | Roberts | ......................... 416/9 |
| 6,409,467 B1 | | 6/2002 | Gutterman | |

FOREIGN PATENT DOCUMENTS

| | | | | |
|---|---|---|---|---|
| DE | 0802324 A1 | * | 6/1996 | ............ F03D/11/04 |
| DE | 1024710.3 | * | 8/2003 | ............. F03D/5/00 |
| ES | 29614614 U1 | * | 10/1996 | ............. F03D/3/02 |

* cited by examiner

Primary Examiner—Nicholas Ponomarenko
Assistant Examiner—Heba Y. M. Elkassabgi

(57) ABSTRACT

A wind power generating system for generating electricity from wind generated by moving vehicles. The wind power generating system includes at least one generating assembly being designed for being positioned proximate the road. The generating assembly is designed for being engaged by the wind generated by vehicles on the road whereby the generating assembly produces electricity when the generating assemblies are engaged by the wind. The generating assembly is operationally coupled to a substation whereby electricity produced by the generating assembly is transferred to the substation for distribution. A frame assembly is coupled to the generating assemblies. The frame assembly is positioned proximate the road whereby the frame assembly is for supporting the generating assemblies in a position optimizing engagement of the generating assembly by the wind when vehicles are traveling along the road.

14 Claims, 3 Drawing Sheets

US 6,809,432 B1

WIND POWER GENERATING SYSTEM

BACKGROUND OF THE INVENTION

1. Field of the Invention

The present invention relates to wind-generated power systems and more particularly pertains to a new wind power generating system for generating electricity from wind generated by moving vehicles.

2. Description of the Prior Art

The use of wind-generated power systems is known in the prior art. U.S. Pat. No. 6,409,467 describes a system for harnessing wind produced by a vehicle to generate supplemental electrical power. Another type of wind-generated power system is U.S. Pat. No. 4,329,593 having a plurality of impellers that are operationally coupled to a generator for harnessing wind to generate electrical power. U.S. Pat. No. 5,272,378 has a plurality of vertically mounted rotors that are rotated by the wind generated by the passage of vehicles to generate electrical power.

SUMMARY OF THE INVENTION

An object of the present invention is to provide a new wind power generating system that positions the generating assemblies above the vehicles to harness the wind from all the vehicles on the road.

Even still another object of the present invention is to provide a new wind power generating system that provides a shield member for each of the generating assemblies to minimize contact to moisture, such as rain and snow, to inhibit the generating assemblies being shorted out by the moisture.

To this end, the present invention generally comprises at least one generating assembly being designed for being positioned proximate the road. The generating assembly is designed for being engaged by the wind generated by vehicles on the road whereby the generating assembly produces electricity when the generating assemblies are engaged by the wind. The generating assembly is operationally coupled to a substation whereby electricity produced by the generating assembly is transferred to the substation for distribution. A frame assembly is coupled to the generating assemblies. The frame assembly is positioned proximate the road whereby the frame assembly is for supporting the generating assemblies in a position optimizing engagement of the generating assembly by the wind when vehicles are traveling along the road.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
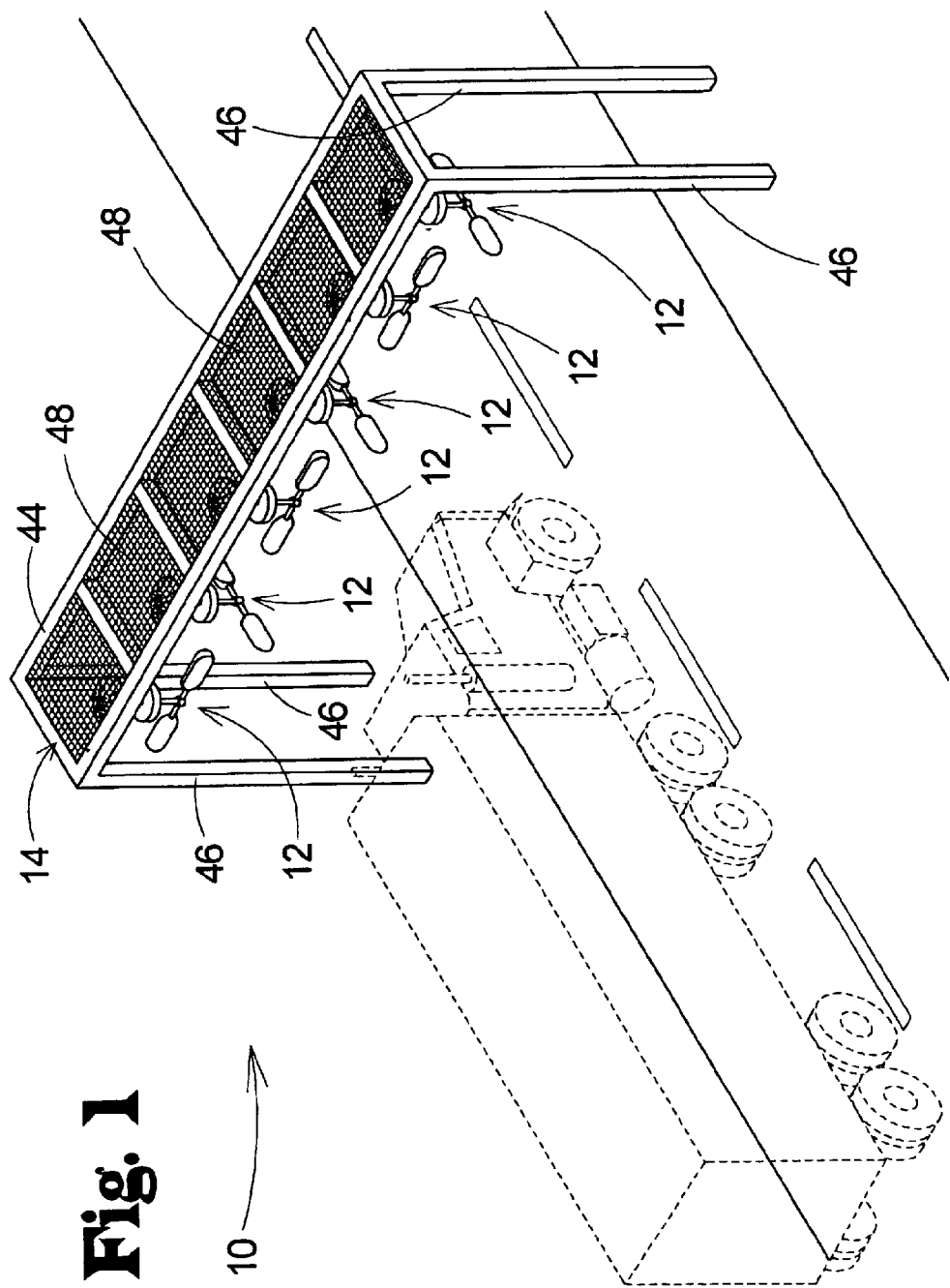
FIG. 1 is a perspective view of a new wind power generating system according to the present invention shown in use.
Figure 2:
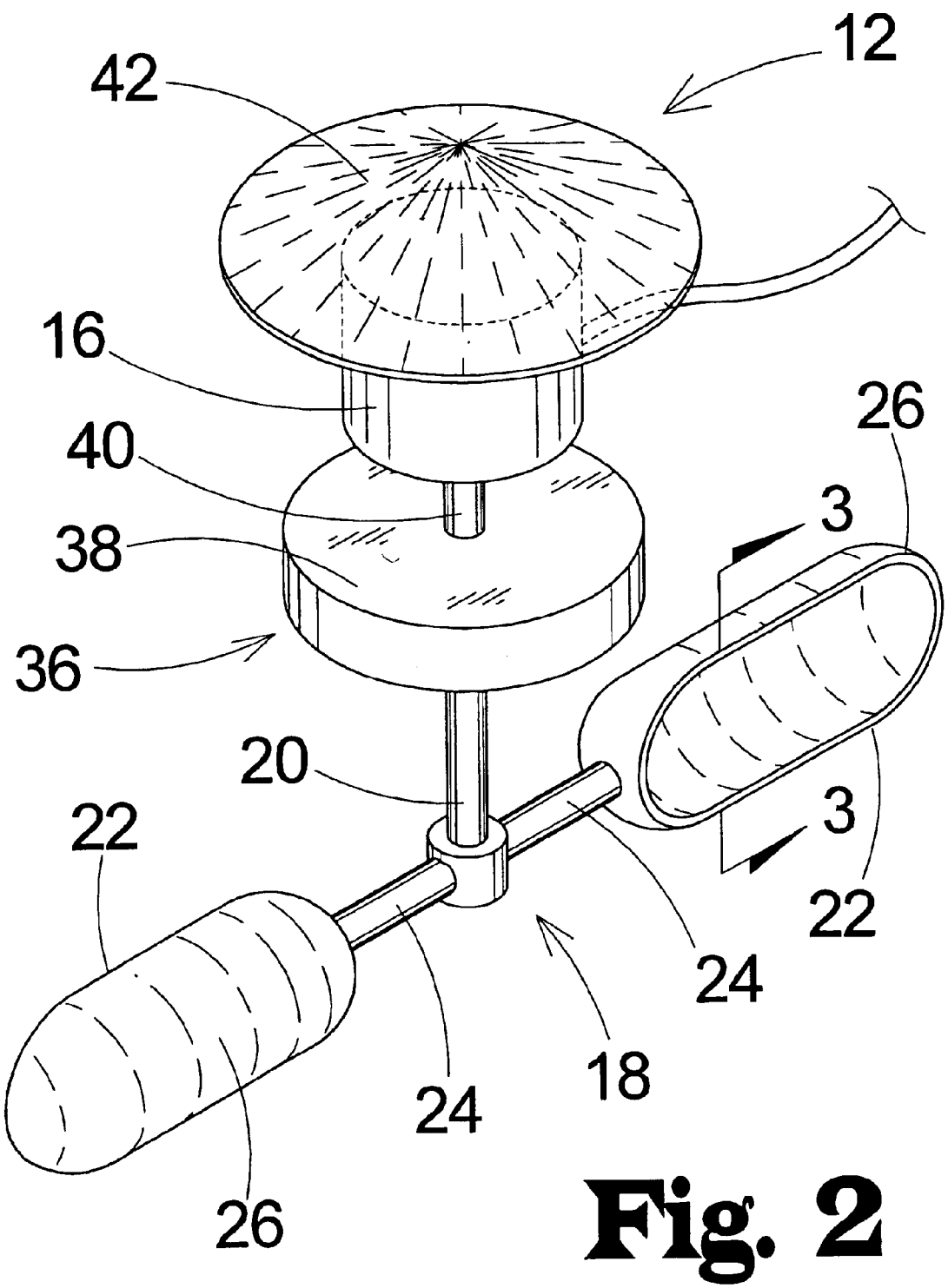
FIG. 2 is a perspective view of one of the generating assemblies of the present invention.
Figure 3:
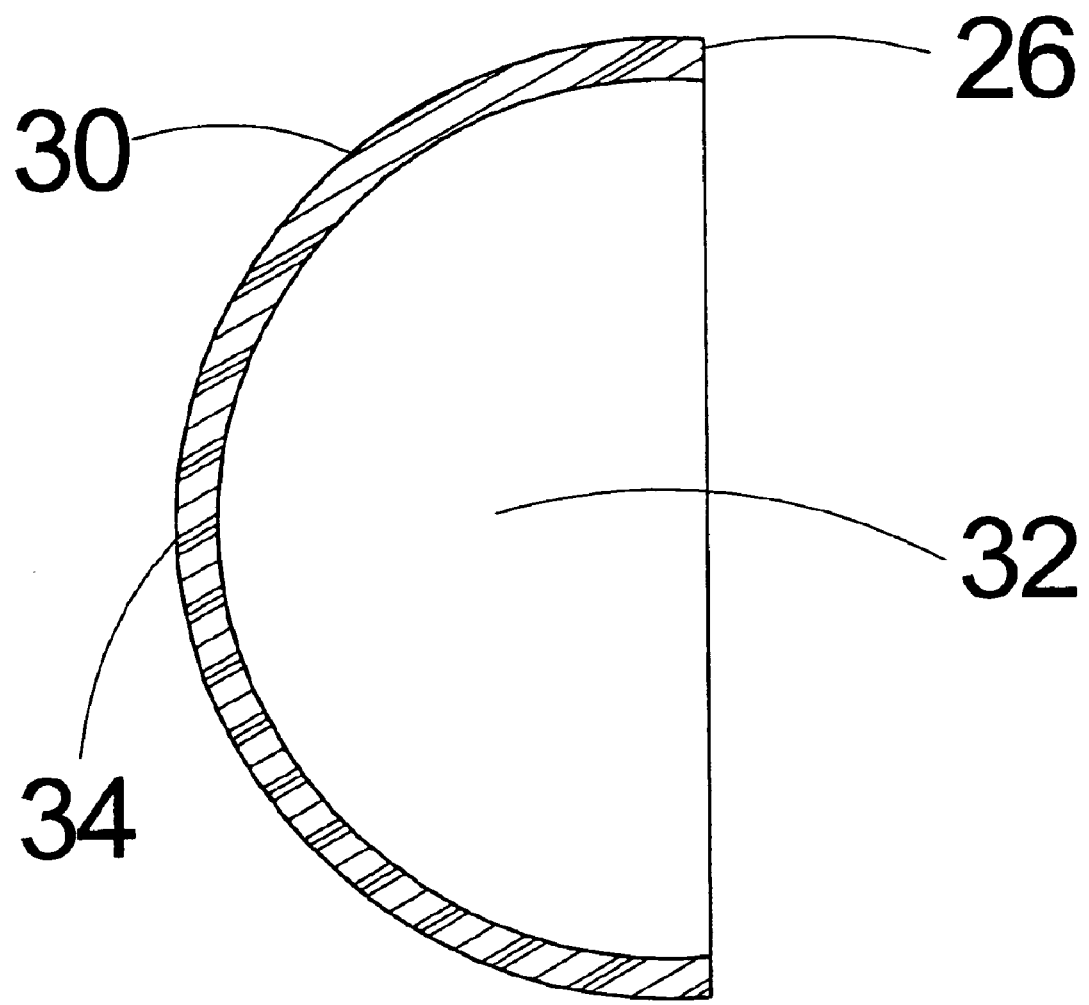
FIG. 3 is a cross-sectional view of the blade portion of the present invention as taken along line 3—3 of FIG. 2.

With reference now to the drawings, and in particular to FIGS. 1 through 3 thereof, a new wind power generating system embodying the principles and concepts of the present invention and generally designated by the reference numeral 10 will be described.

As best illustrated in FIGS. 1 through 3, the wind power generating system 10 generally comprises a plurality of generating assemblies 12 being designed for being positioned proximate the road. Each of the generating assemblies 12 is designed for being engaged by the wind generated by vehicles on the road whereby each of the generating assemblies 12 produces electricity when the generating assemblies 12 are engaged by the wind. Each of the generating assemblies 12 is operationally coupled to a substation whereby electricity produced by the generating assembly is transferred to the substation for distribution.

A frame assembly 14 is coupled to the generating assemblies 12. The frame assembly 14 is positioned proximate the road whereby the frame assembly 14 is for supporting the generating assemblies 12 in a position optimizing engagement of the generating assembly by the wind when vehicles are traveling along the road.

Each of the generating assemblies 12 comprises a generator assembly 16 and a harnessing assembly 18. The harnessing assembly 18 is operationally coupled to the generator assembly 16 of the associated one of the generating assemblies 12 whereby the harnessing assembly 18 actuates the generator assembly 16 when the harnessing assembly 18 is engaged by the wind. The generator assembly 16 is designed for being operationally coupled to the substation whereby the generator assembly 16 is for generating electricity to be transferred to the substation when the generator assembly 16 is actuated by the harnessing assembly 18.

The harnessing assembly 18 comprises a drive shaft 20 and a plurality of cup members 22. The drive shaft 20 is operationally coupled to the generator assembly 16. The cup members 22 are coupled to the drive shaft 20 whereby the cup members 22 are designed for being engaged by the wind to rotate the drive shaft 20 to actuate the generator assembly 16.

Each of the cup members 22 comprises a connector portion 24 and a blade portion 26. The connector portion 24 of each of the cup members 22 is coupled to the drive shaft 20. The blade portion 26 of each of the cup members 22 is coupled to the connector portion 24 of the associated one of the cup members 22 opposite the drive shaft 20. The blade portion 26 of each of the cup members 22 is designed for being engaged by the wind whereby the blade member of each of the cup members 22 is pushed by the wind in a circle around the drive shaft 20 to rotate the drive shaft 20.

The blade portion 26 of each of the cup members 22 comprises a perimeter wall 30. The perimeter wall 30 defines a cavity 32 of the blade portion 26. The cavity 32 of blade portion 26 is designed for catching the wind to rotate the drive shaft 20 when the blade portion 26 of each of the cup members 22 is engaged by the wind. The cavity 32 of the blade portion 26 of each of the cup members 22 is concave. The cavity 32 is designed for directing the force from the wind into forward movement of the associated one of the cup members 22 when the wind enters the cavity 32 of the blade portion 26 from any angle.

An exterior surface 34 of the blade portion 26 of each of the cup members 22 is arcuate. The exterior surface 34 is designed for permitting the wind to pass over the exterior surface 34 of the blade portion 26 to minimize wind resistance when the exterior surface 34 of the blade portion 26 is directed into the wind.

Each of the generating assemblies 12 comprises a transfer assembly 36. The transfer assembly 36 is operationally coupled between the drive shaft 20 and the generator assembly 16 of the associated one of the generating assemblies 12. The transfer assembly 36 is actuated by the drive shaft 20 whereby the transfer assembly 36 increases a rotational speed used to actuate the generator assembly 16 from a rotational speed of the drive shaft 20.

The transfer assembly 36 comprises a gearbox 38 and a transfer shaft 40. The gearbox 38 is operationally coupled to the drive shaft 20. The transfer shaft 40 is operationally coupled between the gearbox 38 and the generator assembly 16. The gearbox 38 is actuated by rotation of the drive shaft 20 whereby the gearbox 38 rotates the transfer shaft 40 at a rotational speed greater than the rotational speed of the drive shaft 20 to actuate the generator assembly 16 to produce electricity.

Each of a plurality of shield members 42 is coupled to one of the generating assemblies 12. Each of the shield members 42 is positioned over and extending outwardly from the associated one of the generating assemblies 12. Each of the shield members 42 is designed for deflecting rain and snow away from the associated one of the generating assemblies 12 to inhibit the rain and snow from shorting out the associated one of the generating assemblies 12.

The frame assembly 14 comprises a canopy member 44 and a plurality of stanchion members 46. The stanchion members 46 are coupled to the canopy member 44 whereby the canopy member 44 extends between the stanchion members 46. The stanchion members 46 are designed for being positioned along side the road whereby the canopy member 44 is positioned over the road. The generating assemblies 12 are coupled to the canopy member 44 whereby the generating assemblies 12 is positioned over the road.

The frame assembly 14 comprises a plurality of screen members 48. Each of the screen members 48 is coupled to the canopy member 44 whereby each of the screen members 48 is designed for permitting exhaust fumes from the vehicles to pass through the canopy member 44 to inhibit the accumulation of exhaust gases under the canopy member 44.

In use, the frame assembly 14 is constructed and positioned proximate the road whereby the canopy member 44 is positioned over the road. The generating assemblies 12 are coupled to the canopy member 44 of the frame assembly 14 so that the generating assemblies 12 are positioned over the road. As vehicle pass travel over the road the wind generated by the vehicle engages the generating assemblies 12 as the vehicle pass under the canopy member 44. The wind engages the cavity 32 of the blade portion 26 of each of the cup members 22 and rotates the drive shaft 20. The rotation of the drive shaft 20 actuates the gearbox 38 which rotates the transfer shaft 40 at higher rate of speed that the drive shaft 20. The transfer shaft 40 actuates the generator assembly 16 to produce electricity which is transferred to the substation. The faster that the transfer shaft 40 is rotated the greater amount of electricity that is produced by the generator assembly 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind power generating system for generating electricity from wind generated by vehicles traveling along a road, the wind power generating system comprising:

at least one generating assembly being adapted for being positioned proximate the road, said generating assembly being adapted for being engaged by the wind generated by vehicles on the road such that said generating assembly produces electricity when said generating assembly is engaged by the wind, said generating assembly being operationally coupled to a substation such that electricity produced by said generating assembly is transferred to the substation for distribution;

a frame assembly being coupled to said generating assembly, said frame assembly being positioned proximate the road such that said frame assembly is for supporting said generating assembly in a position optimizing engagement of said generating assembly by the wind when vehicles are traveling along the road;

said generating assembly comprising a generator assembly and a harnessing assembly, said harnessing assembly being operationally coupled to said generator assembly such that said harnessing assembly actuates said generator assemble when said harnessing assembly is engaged by the wind, said generator assembly being adapted for being operationally coupled to the substation such that said generator assembly is for generating electricity to be transferred to the substation when said generator assembly is actuated by said harnessing assembly; and said harnessing assembly comprising a drive shaft and a plurality of cup members, said drive shaft being operationally coupled to said generator assembly, said cup members being coupled to said drive shaft such that said cup members are adapted for being engaged by the wind to rotate said drive shaft to actuate said generator assembly.

2. The wind power generating system as set forth in claim 1, further comprising:

each of said cup members comprising a connector portion and a blade portion, said connector portion of each of said cup members being coupled to said drive shaft, said blade portion of each of said cup members being coupled to said connector portion of the associated one of said cup members opposite said drive shaft, said blade portion of each of said cup members is adapted for being engaged by the wind such that said blade member of each of said cup members is pushed by the wind in a circle around said drive shaft to rotate said drive shaft.

3. The wind power generating system as set forth in claim 2, further comprising:

said blade portion of each of said cup members comprising a perimeter wall, said perimeter wall defining a cavity of said blade portion, said cavity of blade portion being adapted for catching the wind to rotate the drive shaft when the blade portion of each of the cup members is engaged by the wind.

4. The wind power generating system as set forth in claim 3, further comprising:

said cavity of said blade portion of each of said cup members being concave, said cavity being adapted for directing the force from the wind into forward movement of the associated one of the cup members when the wind enters said cavity of said blade portion from any angle.

5. The wind power generating system as set forth in claim 2, further comprising:

an exterior surface of said blade portion of each of said cup members being arcuate, said exterior surface being adapted for permitting the wind to pass over said exterior surface of said blade portion to minimize wind resistance when said exterior surface of said blade portion is directed into the wind.

6. The wind power generating system as set forth in claim 1, further comprising:

said generating assembly comprising a transfer assembly, said transfer assembly being operationally coupled between said drive shaft and said generator assembly, said transfer assembly being actuated by said drive shaft such that said transfer assembly increases a rotational speed used to actuate said generator assembly from a rotational speed of said drive shaft.

7. The wind power generating system as set forth in claim 6, further comprising:

said transfer assembly comprising a gearbox and a transfer shaft, said gearbox being operationally coupled to said drive shaft, said transfer shaft being operationally coupled between said gearbox and said generator assembly, said gearbox being actuated by rotation of said drive shaft such that said gearbox rotates said transfer shaft at a rotational speed greater than the rotational speed of said drive shaft to actuate said generator assembly to produce electricity.

8. The wind power generating system as set forth in claim 1, further comprising:

a shield member being coupled to said generating assembly, said shield member being positioned over and extending outwardly from said generating assembly, said shield member being adapted for deflecting rain and snow away from said generating assembly to inhibit the rain and snow from shorting out said generating assembly.

9. The wind power generating system as set forth in claim 1, further comprising:

said frame assembly comprising a canopy member and a plurality of stanchion members, said stanchion members being coupled to said canopy member such that said canopy member extends between said stanchion members, said stanchion members being adapted for being positioned along side the road such that said canopy member is positioned over the road, said generating assembly being coupled to said canopy member such that said generating assembly is positioned over the road.

10. The wind power generating system as set forth in claim 9, further comprising:

said frame assembly comprising a plurality of screen members, each of said screen members being coupled to said canopy member such that each of said screen members is adapted for permitting exhaust fumes from the vehicles to pass through said canopy member to inhibit the accumulation of exhaust gases under said canopy member.

11. The wind power generating system as set forth it claim 1, further comprising:

each of said cup members comprising a connector portion and a blade portion, said connector portion of each of said cup members being coupled to said drive shaft, said blade portion of each of said cup members being coupled to said connector portion of the associated one of said cup members opposite said drive shaft, said blade portion of each of said cup members is adapted for being engaged by the wind such that said blade member of each of said cup members is pushed by the wind in a circle around said drive shaft to rotate said drive shaft;

said blade portion of each of said cup members comprising a perimeter wall, said perimeter wall defining a cavity of said blade portion, said cavity of blade portion being adapted for catching the wind to rotate the drive shaft when the blade portion of each of the cup members is engaged by the wind;

said cavity of said blade portion of each of said cup members being concave, said cavity being adapted for directing the force from the wind into forward movement of the associated one of the cup members when the wind enters said cavity of said blade portion from any angle;

an exterior surface of said blade portion of each of said cup members being arcuate, said exterior surface being adapted for permitting the wind to pass over said exterior surface of said blade portion to minimize wind resistance when said exterior surface of said blade portion is directed into the wind;

each of said generating assemblies comprising a transfer assembly, said transfer assembly being operationally coupled between said drive shaft and said generator assembly of the associated one of said generating assemblies, said transfer assembly being actuated by said drive shaft such that said transfer assembly increases a rotational speed used to actuate said generator assembly from a rotational speed of said drive shaft;

said transfer assembly comprising a gearbox and a transfer shaft, said gearbox being operationally coupled to said drive shaft, said transfer shaft being operationally coupled between said gearbox and said generator assembly, said gearbox being actuated by rotation of said drive shaft such that said gearbox rotates said transfer shaft at a rotational speed greater than the rotational speed of said drive shaft to actuate said generator assembly to produce electricity;

each of a plurality of shield members being coupled to one of said generating assemblies, each of said shield members being positioned over and extending outwardly from the associated one of said generating assemblies, each of said shield members being adapted for deflecting rain and snow away from the associated one of said generating assemblies to inhibit the rain and snow from shorting out the associated one of said generating assemblies;

said frame assembly comprising a canopy member and a plurality of stanchion members, said stanchion members being coupled to said canopy member such that said canopy member extends between said stanchion members, said stanchion members being adapted for being positioned along side the road such that said canopy member is positioned over the road, said generating assemblies being coupled to said canopy member such that said generating assemblies are positioned over the road; and said frame assembly comprising a plurality of screen members, each of said screen members being coupled to said canopy member such that each of said screen members is adapted for permitting exhaust fumes from the vehicles to pass through said canopy member to inhibit the accumulation of exhaust gases under said canopy member.

12. A wind power generating system for generating electricity from wind generated by vehicles traveling along a road, the wind power generating system comprising:

at least one generating assembly being adapted for being positioned proximate the road, said generating assembly being adapted for being engaged by the wind generated by vehicles on the road such that said generating assembly produces electricity when said generating assembly is engaged by the wind, said generating assembly being operationally coupled to a substation such that electricity produced by said generating assembly is transferred to the substation for distribution;

a frame assembly being coupled to said generating assembly, said frame assembly being positioned proximate the road such that said frame assembly is for supporting said generating assembly in a position optimizing engagement of said generating assembly by the wind when vehicles are traveling along the road; and a shield member being coupled to said generating assembly, said shield member being positioned over and extending outwardly from said generating assembly, said shield member being adapted for deflecting rain and snow away from said generating assembly to inhibit the rain and snow from shorting out said generating assembly.

13. A wind power generating system for generating electricity from wind generated by vehicles traveling along a road, the wind power generating system comprising:

at least one generating assembly being adapted for being positioned proximate the road, said generating assembly being adapted for being engaged by the wind generated by vehicles on the road such that said generating assembly produces electricity when said generating assembly is engaged by the wind, said generating assembly being operationally coupled to a substation such that electricity produced by said generating assembly is transferred to the substation for distribution;

a frame assembly being coupled to said generating assembly, said frame assembly being positioned proximate the road such that said frame assembly is for supporting said generating assembly in a position optimizing engagement of said generating assembly by the wind when vehicles are traveling along the road; and said frame assembly comprising a canopy member and a plurality of stanchion members, said stanchion members being coupled to said canopy member such that said canopy member extends between said stanchion members, said stanchion members being adapted for being positioned along side the road such that said canopy member is positioned over the road, said generating assembly being coupled to said canopy member such that said generating assembly is positioned over the road.

14. The wind power generating system as set forth in claim 13, further comprising:

said frame assembly comprising a plurality of screen members, each of said screen members being coupled to said canopy member such that each of said screen members is adapted for permitting exhaust fumes from the vehicles to pass through said canopy member to inhibit the accumulation of exhaust gases under said canopy member.

\* \* \* \* \*